US012087272B2

(12) United States Patent
Rosenberg et al.

(10) Patent No.: US 12,087,272 B2
(45) Date of Patent: Sep. 10, 2024

(54) TRAINING SPEECH SYNTHESIS TO GENERATE DISTINCT SPEECH SOUNDS

(71) Applicant: Google LLC, Mountain View, CA (US)

(72) Inventors: Andrew Rosenberg, Brooklyn, NY (US); Bhuvana Ramabhadran, Mt. Kisco, NY (US); Fadi Biadsy, Sandyston, NY (US); Yu Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 274 days.

(21) Appl. No.: 17/756,995

(22) PCT Filed: Dec. 13, 2019

(86) PCT No.: PCT/US2019/066370
§ 371 (c)(1),
(2) Date: Jun. 7, 2022

(87) PCT Pub. No.: WO2021/118604
PCT Pub. Date: Jun. 17, 2021

(65) Prior Publication Data
US 2023/0009613 A1 Jan. 12, 2023

(51) Int. Cl.
*G10L 15/16* (2006.01)
*G10L 13/047* (2013.01)
(Continued)

(52) U.S. Cl.
CPC .......... *G10L 13/047* (2013.01); *G10L 13/086* (2013.01); *G10L 15/063* (2013.01); *G10L 15/16* (2013.01)

(58) Field of Classification Search
CPC ... G10L 13/047; G10L 13/086; G10L 15/063; G10L 15/16
See application file for complete search history.

(56) References Cited

U.S. PATENT DOCUMENTS 6,134,528 A   10/2000 Miller et al.
10,373,605 B2   8/2019 Reber et al.
(Continued)

FOREIGN PATENT DOCUMENTS

EP   680653 B1   6/2001

OTHER PUBLICATIONS

G. Li, L. Luo, C. Gong and S. Lv, "End-to-end Tibetan Speech Synthesis Based on Phones and Semi-syllables," 2019 Asia-Pacific Signal and Information Processing Association Annual Summit and Conference (APSIPA ASC), Lanzhou, China, 2019, pp. 1294-1297, doi: 10.1109/APSIPAASC47483.2019.9023093. keyword (Year: 2019).*
(Continued)

*Primary Examiner* — Bharatkumar S Shah
(74) *Attorney, Agent, or Firm* — Honigman LLP; Brett A. Krueger; Grant Griffith

(57) ABSTRACT

A method (800) of training a text-to-speech (TTS) model (108) includes obtaining training data (150) including reference input text (104) that includes a sequence of characters, a sequence of reference audio features (402) representative of the sequence of characters, and a sequence of reference phone labels (502) representative of distinct speech sounds of the reference audio features. For each of a plurality of time steps, the method includes generating a corresponding predicted audio feature (120) based on a respective portion of the reference input text for the time step and generating, using a phone label mapping network (510), a corresponding predicted phone label (520) associated with the predicted audio feature. The method also includes aligning the predicted phone label with the reference phone label to determine a corresponding predicted phone label loss (622) and updating the TTS model based on the corresponding predicted phone label loss.

24 Claims, 9 Drawing Sheets

(51) Int. Cl.
    *G10L 13/08*     (2013.01)
    *G10L 15/06*     (2013.01)

(56) References Cited

U.S. PATENT DOCUMENTS

| | | | | |
|---|---|---|---|---|
| 2003/0028380 A1* | 2/2003 | Freeland | ............... | G10L 13/00 |
| | | | | 704/260 |
| 2004/0049388 A1* | 3/2004 | Roth | ............... | G10L 15/19 |
| | | | | 704/251 |
| 2018/0268806 A1* | 9/2018 | Chun | ............... | G10L 13/027 |

OTHER PUBLICATIONS

M. Mimura, S. Ueno, H. Inaguma, S. Sakai and T. Kawahara, "Leveraging Sequence-to-Sequence Speech Synthesis for Enhancing Acoustic-to-Word Speech Recognition," 2018 IEEE Spoken Language Technology Workshop (SLT), Athens, Greece, 2018, pp. 477-484, doi: 10.1109/SLT.2018.8639589. keywords: {Decoding;Sp (Year: 2018).*

Indian Office Action for the related Application No. 202227031735, dated Sep. 21, 2022, 8 pages.

Aug. 10, 2020 Written Opinion (WO) of the International Searching Authority (ISA) and International Search Report (ISR) issued in International Application No. PCT/US2019/066370.

\* cited by examiner

TRAINING SPEECH SYNTHESIS TO GENERATE DISTINCT SPEECH SOUNDS

TECHNICAL FIELD

This disclosure relates to training speech synthesis to generate distinct speech sounds.

BACKGROUND

Neural networks are machine learning models that employ one or more layers of nonlinear units to predict an output for a received input. For instance, neural networks may convert input text to output speech. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Speech synthesis systems (i.e., neural networks that convert input text to output speech) are trained to generate natural and intelligible speech. These systems are typically trained to minimize the distance between the hypothesized representation of a speech signal (i.e., the output of the network) and a reference (i.e., training) speech signal.

SUMMARY

One aspect of the disclosure provides a method of training a text-to-speech (TTS) model. The method includes obtaining, at data processing hardware, training data that includes reference input text that includes a sequence of characters in a particular language, a sequence of reference audio features representative of the sequence of characters, and a sequence of reference phone labels representative of distinct speech sounds for the sequence of reference audio features. For each of a plurality of time steps, the method includes generating, by the data processing hardware, a corresponding predicted audio feature based on a respective portion of the reference input text for the time step and generating, by the data processing hardware, using a phone label mapping network, a corresponding predicted phone label associated with the predicted audio feature for the time step. The method also includes aligning, by the data processing hardware, the predicted phone label for the time step with the reference phone label for the time step to determine a corresponding predicted phone label loss and updating, by the data processing hardware, the TTS model based on the corresponding predicted phone label loss determined for each of the plurality of time steps.

Implementations of the disclosure may include one or more of the following optional features. In some implementations, the method further includes, for each of the plurality of time steps, determining, by the data processing hardware, a corresponding predicted audio feature loss based on the corresponding predicted audio feature for the time step and the reference audio feature of the sequence of reference audio features for the time step. Updating the TTS model may be further based on the corresponding predicted audio feature loss determined for each of the plurality of time steps.

In some examples, the method further includes, executing, by the data processing hardware, using a speech recognition model, a forced-alignment process to time-align the sequence of reference audio features with the sequence of reference phone labels. Optionally, generating, for each of the plurality of time steps, the corresponding predicted audio feature may include processing, using an encoder neural network, the sequence of characters to generate a feature representation of the sequence of characters and processing, using an attention network, the feature representation to generate a fixed-length context vector for the time step. Generating the corresponding predicted audio feature may also include processing, using a decoder neural network, the fixed-length context vector for the time step to generate the corresponding predicted audio feature for the time step.

In some implementations, the encoder neural network includes a convolutional layer and a bidirectional long short-term memory (LSTM) layer and the feature representation includes a sequential feature representation that represents a local structure of the sequence of characters around a particular character in the sequence of characters. In some examples, the decoder neural network includes an autoregressive neural network that includes a convolutional subnetwork and an output layer. The corresponding predicted audio feature generated for each of the plurality of time steps may be further based on the reference audio feature of the sequence of reference audio features for a previous time step and the reference phone label of the sequence of reference audio features for the previous time step.

In some implementations, generating, for each of the plurality of time steps, using the phone label mapping network, the corresponding predicted phone label includes receiving, at the phone label mapping network, the predicted audio feature generated for the corresponding time step as a feature input, processing, by the phone label mapping network, the received predicted audio feature generated for the corresponding time step to generate the corresponding predicted phone label for the corresponding time step, and mapping, by the phone label mapping network, the corresponding predicted phone label generated for the corresponding time step to the predicted audio feature generated for the corresponding time step.

In some examples, the reference audio features include reference mel-frequency spectrograms and the predicted audio features include predicted mel-frequency spectrograms. The sequence of reference audio features may correspond to a reference time-domain audio waveform, each of the plurality of time steps may correspond to a respective time in a predicted audio waveform, and the corresponding predicted audio feature generated for each of the plurality of time steps may include an amplitude value of the predicted audio waveform at the corresponding time step.

In some implementations, the TTS model includes an encoder neural network, an attention network, and a decoder neural network. In other implementations, the TTS model includes a parametric synthesizer model having a single frame synchronous neural network.

Another aspect of the disclosure provides a system for training a text-to-speech model. The system includes data processing hardware and memory hardware in communication with the data processing hardware. The memory hardware stores instructions that when executed on the data processing hardware cause the data processing hardware to perform operations. The operations include obtaining training data that includes reference input text that includes a sequence of characters in a particular language, a sequence of reference audio features representative of the sequence of characters, and a sequence of reference phone labels representative of distinct speech sounds for the sequence of reference audio features. For each of a plurality of time steps, the operations include generating a corresponding predicted audio feature based on a respective portion of the reference input text for the time step and generating using a phone label mapping network, a corresponding predicted phone label associated with the predicted audio feature for the time step. The operations also include aligning the predicted phone label for the time step with the reference phone label for the time step to determine a corresponding predicted phone label loss and updating the TTS model based on the corresponding predicted phone label loss determined for each of the plurality of time steps.

This aspect may include one or more of the following optional features. In some implementations, the operations further include, for each of the plurality of time steps, determining a corresponding predicted audio feature loss based on the corresponding predicted audio feature for the time step and the reference audio feature of the sequence of reference audio features for the time step. Updating the TTS model may be further based on the corresponding predicted audio feature loss determined for each of the plurality of time steps.

In some examples, the operations further include executing, using a speech recognition model, a forced-alignment process to time-align the sequence of reference audio features with the sequence of reference phone labels. Optionally, generating, for each of the plurality of time steps, the corresponding predicted audio feature may include processing, using an encoder neural network, the sequence of characters to generate a feature representation of the sequence of characters and processing, using an attention network, the feature representation to generate a fixed-length context vector for the time step. Generating the corresponding predicted audio feature may also include processing, using a decoder neural network, the fixed-length context vector for the time step to generate the corresponding predicted audio feature for the time step.

In some implementations, the encoder neural network includes a convolutional layer and a bidirectional long short-term memory (LSTM) layer and the feature representation includes a sequential feature representation that represents a local structure of the sequence of characters around a particular character in the sequence of characters. In some examples, the decoder neural network includes an autoregressive neural network that includes a convolutional subnetwork and an output layer. The corresponding predicted audio feature generated for each of the plurality of time steps may be further based on the reference audio feature of the sequence of reference audio features for a previous time step and the reference phone label of the sequence of reference audio features for the previous time step.

In some implementations, generating, for each of the plurality of time steps, using the phone label mapping network, the corresponding predicted phone label includes receiving, at the phone label mapping network, the predicted audio feature generated for the corresponding time step as a feature input, processing, by the phone label mapping network, the received predicted audio feature generated for the corresponding time step to generate the corresponding predicted phone label for the corresponding time step, and mapping, by the phone label mapping network, the corresponding predicted phone label generated for the corresponding time step to the predicted audio feature generated for the corresponding time step.

In some examples, the reference audio features include reference mel-frequency spectrograms and the predicted audio features include predicted mel-frequency spectrograms. The sequence of reference audio features may correspond to a reference time-domain audio waveform, each of the plurality of time steps may correspond to a respective time in a predicted audio waveform, and the corresponding predicted audio feature generated for each of the plurality of time steps may include an amplitude value of the predicted audio waveform at the corresponding time step.

In some implementations, the TTS model includes an encoder neural network, an attention network, and a decoder neural network. In other implementations, the TTS model includes a parametric synthesizer model having a single frame synchronous neural network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Speech synthesis systems (e.g., traditional parametric and end-to-end neural network learning models) are trained to generate natural and intelligible speech. These systems are trained to minimize the distance between a hypothesized representation of a speech signal and a reference (i.e., training) signal. These representations may be a variety of formats (e.g., vocoder parameters, filterbank coefficients, direct waveform representations, etc.) and are directly convertible to audible speech. The distance between the hypothesized representation generated by the system and the reference signal is measured using a loss function. For example, loss functions such as mean absolute error, mean square error, or mean bias error may be used to indicate the accuracy of the prediction (i.e., the hypothesis) and may be fed back to the model to optimize or train parameters (e.g., weights) of the model.

However, the resultant hypothesized signal is interpreted as categorical speech sounds (i.e., phones) by listeners to understand the speech. This relationship sound is not used in the training of speech synthesis. This leads to less intelligible synthetic speech because some speech sounds (e.g., the fricative consonants /ʃ/ and /f/ or the vowels /æ/ and /ɑ/) are perceptually distinct to listeners despite being relatively close in the signal space. That is, the loss function measuring the accuracy of these speech sounds may indicate an accurate prediction despite being unintelligible to a listener.

Thus, implementations herein are directed toward a system for training speech synthesis models (i.e., parametric or end-to-end text-to-speech (TTS) models) to generate distinct speech sounds by using audio data that includes frame-aligned phone labels. Here, the speech synthesis model includes a phone label mapping network configured to predict a phone label for every frame of a speech representation (e.g., predicted audio feature) and a cross-entropy loss term that measures the distance between the speech representation and a reference audio feature (e.g., a ground truth acoustic signal) and a reference phone label.

Figure 1:
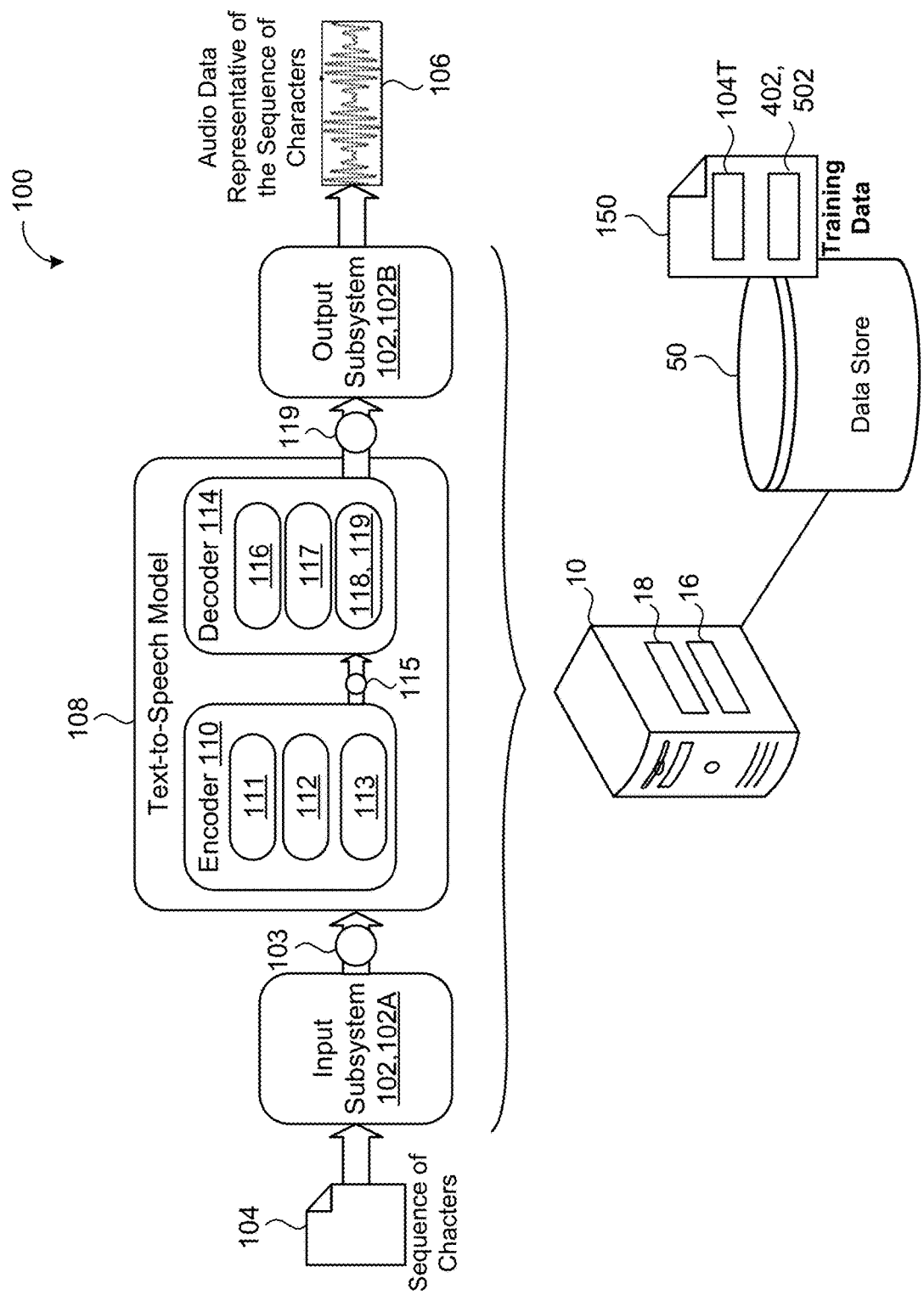
FIG. 1 is a schematic view of an example system for training speech synthesis.

Referring now to FIG. 1, in some implementations, an example system 100 includes a computing device 10 executing a text-to-speech (TTS) model 108. The computing device 10 may correspond to any computing device, such as a desktop workstation, a laptop workstation, or a mobile device (i.e., a smart phone). The computing device may also be a single computer, multiple computers, or a distributed system (e.g., a cloud environment) having scalable/elastic computing resources 18 (e.g., data processing hardware) and/or storage resources 16 (e.g., memory hardware). A data store 50 is overlain on the storage resources 16 to allow scalable use of the storage resources 16 by the computing resources 18.

The TTS model 108 receives input text 104 and processes that input text 104 (i.e., a sequence of characters) through one or more neural networks to generate speech 106 (i.e., audio data representative of the sequence of characters 104) that is a verbalization or a narration of the input text 104. For example, when the TTS model 108 receives as input the text of a page of a book, the model 108 processes the text to generate a verbal narration of the page.

The computing device 10 also executes subsystems 102 including an input subsystem 102, 102A, configured to receive the input text 104 as input, and an output subsystem 102, 102B, configured to provide speech 106 as output. That is, the input subsystem 102A may receive the text input 104 while the output subsystem 102B may output the audio data 106 representative of the text input 104. The input text 104 includes a sequence of characters in a particular natural language, e.g., English, Spanish, or French. The sequence of characters can include letters, numbers, punctuation marks, and/or other special characters. The speech 106 that the TTS model 108 generates approximates human speech, i.e., how a human would verbalize the sequence of characters that make up the input text 104.

The input subsystem 102A may include an optical character recognition (OCR) unit to convert images of typed, handwritten, or printed text into machine-encoded text. The output subsystem 102B, in some examples, includes an audio output device to convert time-domain audio waveforms into audio. In some implementations, the input subsystem 102A is configured to convert each character in the sequence of characters 104 (i.e., the input text) into a one-hot vector and embed each one-hot vector in a continuous vector. That is, the input subsystem 102A may represent each character in the sequence as a one-hot vector and then generate an embedding 103, i.e., a vector or other ordered collection of numeric values, of the character.

The TTS model 108 may be configured to receive character embeddings 103 from the input subsystem 102A and process those character embeddings 103 to generate time-domain audio waveforms 119. The time-domain audio waveforms 119 are audio waveforms that define an amplitude of an audio signal over time. In particular, an encoder neural network 110 of the TTS model 108 is configured to receive the character embeddings 103 from the input subsystem 102A and generate a fixed-length context vector 115 for each mel-frequency spectrogram 118 that a decoder neural network 114 will later generate. The fixed-length context vectors 115 define features that appear in particular positions in the sequence of characters 104. The features defined by the context vectors 115 model the context in which each character in the sequence of characters 104 appears.

In some implementations, the encoder neural network 110 includes one or more convolutional layers 111 followed by a bi-directional long short-term memory ("LSTM") layer 112. The neurons in each convolutional layer may receive input from only a small subset of neurons in a previous layer. This neuron connectivity allows the convolutional layers to learn filters that activate when particular hidden features appear in particular positions in a sequence of characters 104. In some examples, each filter in each convolutional layer spans four, five, or six characters. Each convolutional layer may be followed by batch normalization and rectified linear units ("ReLUs"). In implementations where the encoder neural network 110 includes one or more convolutional layers, a bi-directional LSTM layer 112 may optionally follow those convolutional layers. The bi-directional LSTM layer 112 may be configured to process the hidden features generated by the final convolutional layer 111 to generate a sequential feature representation of the sequence of characters 104. As used herein, a sequential feature representation represents a local structure of the sequence of characters 104 around a particular character. In some examples, the sequential feature representation includes a sequence of feature vectors.

In some implementations, the encoder neural network 110 also includes an attention network 113. The attention network 113 may be configured to receive a sequential feature representation from another component of the encoder neural network 110, e.g., a bi-directional LSTM layer 112, and process the sequential feature representation to generate a fixed-length context vector 115 for each decoder output step. That is, the attention network 113 may generate a fixed-length context vector 115 for each frame of a mel-frequency spectrogram 118 that the decoder neural network 114 will later generate. A frame is a unit of the mel-frequency spectrogram 118 that is based on a small portion of the input signal, e.g., a 10 millisecond sample of the input signal. The attention network 113 may determine a weight for each element of the encoder output and generates the fixed-length context vector 115 by determining a weighted sum of each element. The attention weights may change for each decoder time step.

The decoder neural network 114 is configured to receive as input the fixed-length context vectors 115 and generate as output a corresponding frame of a mel-frequency spectrogram 118. The mel-frequency spectrogram 118 is a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. In some implementations, the decoder neural network 114 generates mel-frequency spectrograms 118 having a frame length of 12.5 milliseconds. In other implementations, the decoder neural network 114 is configured to generate mel-frequency spectrograms 118 having frame lengths less than or greater than 12.5 milliseconds. The architecture of the decoder neural network 114 will be described in more detail below with reference to FIG. 2.

In some examples, the decoder 114 includes an autoregressive neural network 116 configured to receive mel-frequency spectrograms 118 and generate corresponding audio output samples 119 based on the mel-frequency spectrograms 118. The decoder 114 may include a vocoder network 117. For example, the vocoder network 117 may be based on a parallel feed-forward neural network.

The autoregressive neural network 116 may receive the mel-frequency spectrograms 118 from the decoder neural network 114 and operate in an auto-regressive manner over multiple time steps. At a given time step, the autoregressive neural network 116 generates a probability distribution over a plurality of possible audio output samples 119 for the time step conditioned on the following: (i) a current output sequence of audio data 119, including respective audio output samples 119 for one or more preceding time steps in the output sequence of audio data, and (ii) the mel-frequency spectrogram 118 for the time step. The output subsystem 102B, in some examples, selects the audio sample 119 for the current step using the probability distribution for the time step. An exemplary architecture of the autoregressive neural network 116 is described in more detail below with reference to FIG. 3. The output subsystem 102B, after selecting the audio output sample 106 for the time step from the probability distribution, may output/play the audio output sample 106 through an audio output device (e.g., a speaker).

Thus, the TTS model 108 may generate speech from text using neural networks trained on sample input texts 104 and corresponding mel-frequency spectrograms 118 of human speech alone. That is, the model 108 does not receive complex linguistic and acoustic features that require significant domain expertise to produce. Instead, the system may convert input character sequences 104 to mel-frequency spectrograms 118 using an end-to-end neural network. In some examples, the autoregressive neural network 116 of the decoder 114 is separately-trained on mel-frequency spectrograms 118 and may generate time-domain audio waveforms 119.

Figure 2:
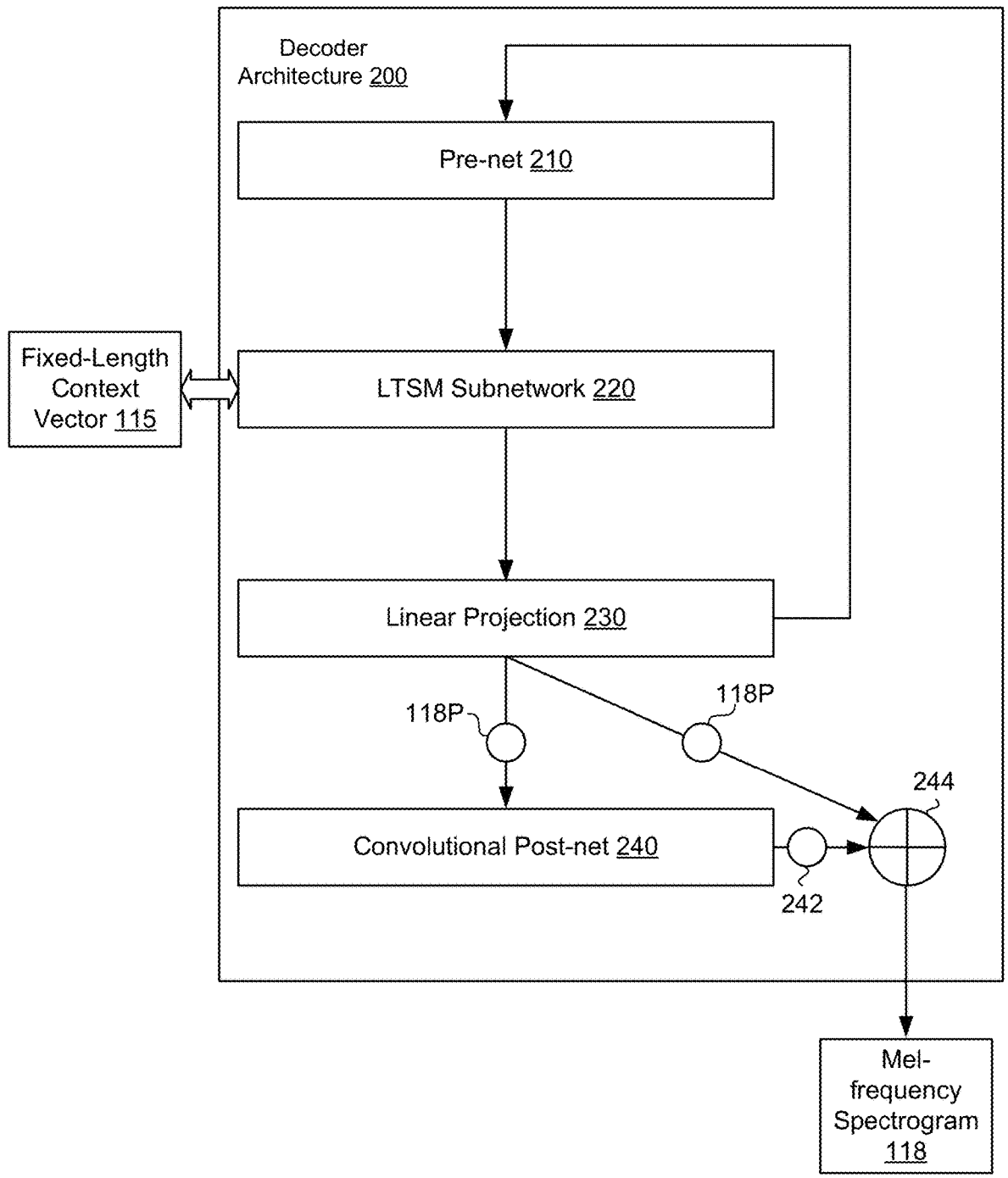
FIG. 2 is a schematic view of an example architecture for a decoder neural network.

Referring now to FIG. 2, an example decoder architecture 200 for the decoder neural network 114 includes a pre-net 210 through which a mel-frequency spectrogram prediction for a previous time step passes. The pre-net 210 may include two fully-connected layers of hidden ReLUs. The pre-net 210 acts as an information bottleneck for learning attention to increase convergence speed and to improve generalization capability of the speech synthesis system during training. In order to introduce output variation at inference time, dropout with probability 0.5 may be applied to layers in the pre-net.

The decoder architecture 200, in some implementations, also includes an LSTM subnetwork 220 with two or more LSTM layers. At each time step, the LSTM subnetwork 220 receives a concatenation of the output of the pre-net 210 and a fixed-length context vector 202 for the time step. The LSTM layers may be regularized using zoneout with probability of, for example, 0.1. A linear projection 230 receives as input the output of the LSTM subnetwork 220 and produces a prediction of the mel-frequency spectrogram 118P.

In some examples, a convolutional post-net 240 with one or more convolutional layers processes the predicted mel-frequency spectrogram 118P for the time step to predict a residual 242 to add to the predicted mel-frequency spectrogram 118P at adder 244. This improves the overall reconstruction. Each convolutional layer except for the final convolutional layer may be followed by batch normalization and hyperbolic tangent (Tan H) activations. The convolutional layers are regularized using dropout with a probability of, for example, 0.5. The residual 242 is added to the predicted mel-frequency spectrogram 118P generated by the linear projection 230, and the sum (i.e., the mel-frequency spectrogram 118) may be provided to the autoregressive network 116 (FIG. 1).

In some examples, in parallel to the decoder neural network 114 predicting mel-frequency spectrograms 118 for each time step, a concatenation of the output of the LSTM subnetwork 220 and the fixed-length context vector 115 is projected to a scalar and passed through a sigmoid activation to predict the probability that the output sequence of mel frequency spectrograms 118 has completed. This "stop token" prediction is used during inference to allow the model to dynamically determine when to terminate generation instead of always generating for a fixed duration. When the stop token indicates that generation has terminated, i.e., when the stop token probability exceeds a threshold value, the decoder neural network 114 stops predicting mel-frequency spectrograms 118P and returns the mel-frequency spectrograms predicted up to that point. Alternatively, the decoder neural network 114 may always generate mel-frequency spectrograms 118 of the same length (e.g., 10 seconds).

Figure 3:
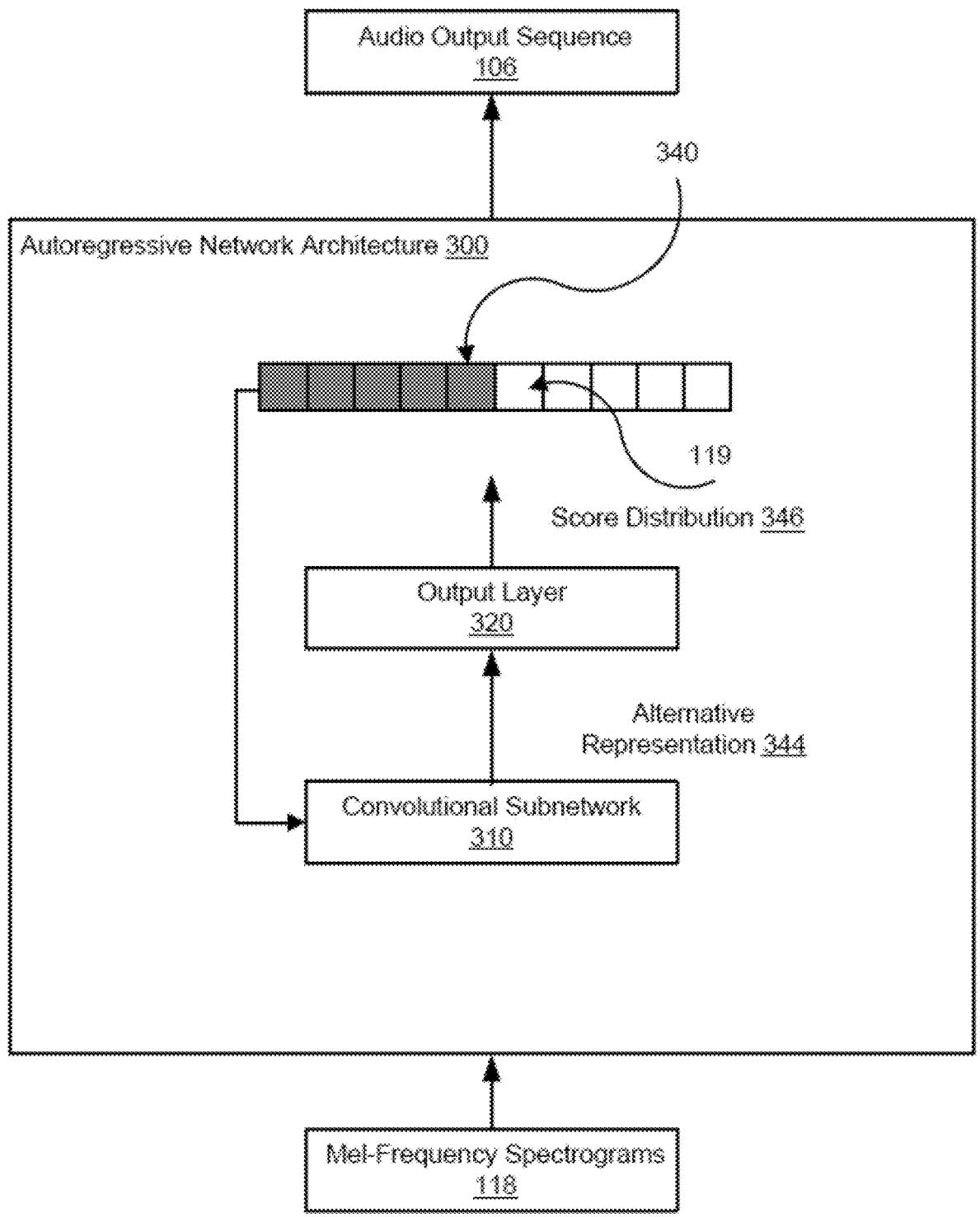
FIG. 3 is a schematic view of an example architecture of an autoregressive neural network.

Referring now to FIG. 3, an exemplary autoregressive network architecture 300 generates the sequences of audio data 119 each including a respective audio output sample at each of multiple time steps. Generally, each time step in a given audio output sequence corresponds to a respective time in an audio waveform. The audio output sample at the time step characterizes the waveform at the corresponding time. In some implementations, the audio output sample 119 at each time step in the audio output sequence is the amplitude of the audio waveform at the corresponding time, i.e., the audio output sequence 119 generated by the architecture 300 is a raw audio waveform. In some implementations, the audio output sample 119 at each time step in the sequence is a compressed representation of the waveform at the corresponding time. For example, the audio output sample is a u-law transformed representation of the waveform.

In some implementations, the architecture 300 receives as input, at each of multiple time steps, a mel-frequency spectrogram 118 and generates a corresponding audio output sample 119 at each of the multiple time steps by conditioning the architecture 300 on both the mel-frequency spectrogram 118 and at least a portion of current audio output sequence (i.e., one or more audio output samples 118 from preceding time steps). Together, the audio output samples 119 form an audio output sequence 106.

Specifically, at each time step during the generation of an audio output sequence 119, a convolutional subnetwork 310 receives a current audio output sequence 340 that includes audio output samples 119 that the architecture 300 has already generated previous to the current time step. The convolutional subnetwork 310 processes the current audio output sequence 340, conditioned on a mel-frequency spectrogram 118 for the time step, to generate an alternative representation 344 for the time step. The alternative representation 344 may be a numeric representation, i.e., an ordered collection of numeric values, in which the current audio output sequence 340 has been encoded by the convolutional subnetwork, for example by encoding features of the current audio output sequence 340.

In some examples, the output layer 320 is configured to, at each of the time steps, receive the alternative representation 344 and generate a probability distribution over possible audio output samples 119 for the time step. In some implementations, the output layer 320 is a logistic output layer that generates parameters, e.g., mean, log scale, or mixture weight, of a logistic mixture distribution over possible audio output samples 119 for the time step. The logistic output layer may include ReLUs followed by a linear projection. In other implementations, the output layer 320 is a softmax output layer that generates a discrete probability distribution over possible audio samples 119 for the time step. That is, each possible audio sample 119 is associated with a discrete score.

Once the output layer 320 has generated the score distribution for a given time step, the output subsystem 102B (FIG. 1), or some other external subsystem, may select an audio output sample 119 to be included in the audio output sequence 106 in accordance with the score distribution for the given time step. In some examples, the convolutional subnetwork 310 generally includes multiple audio-processing convolutional neural network layers. More specifically, the audio-processing convolutional neural network layers may include multiple causal convolutional layers.

A causal convolutional layer is a convolutional layer that operates on an input sequence 104 that has a respective input at each of multiple time steps by, for each time step, generating an output that depends only on the inputs at the time step and at the time steps before the time step in the input sequence and not on any inputs at any time steps after the time step in the input sequence. In some cases, the causal convolutional layers are implemented by applying a normal convolution and then shifting each output of the normal convolution by a few time steps, i.e., shifting each output forward by (filter length—1) time steps, prior to applying the activation function for the convolutional layer, where "filter length" is the length of the filter of the convolution that is being applied.

Figure 4:
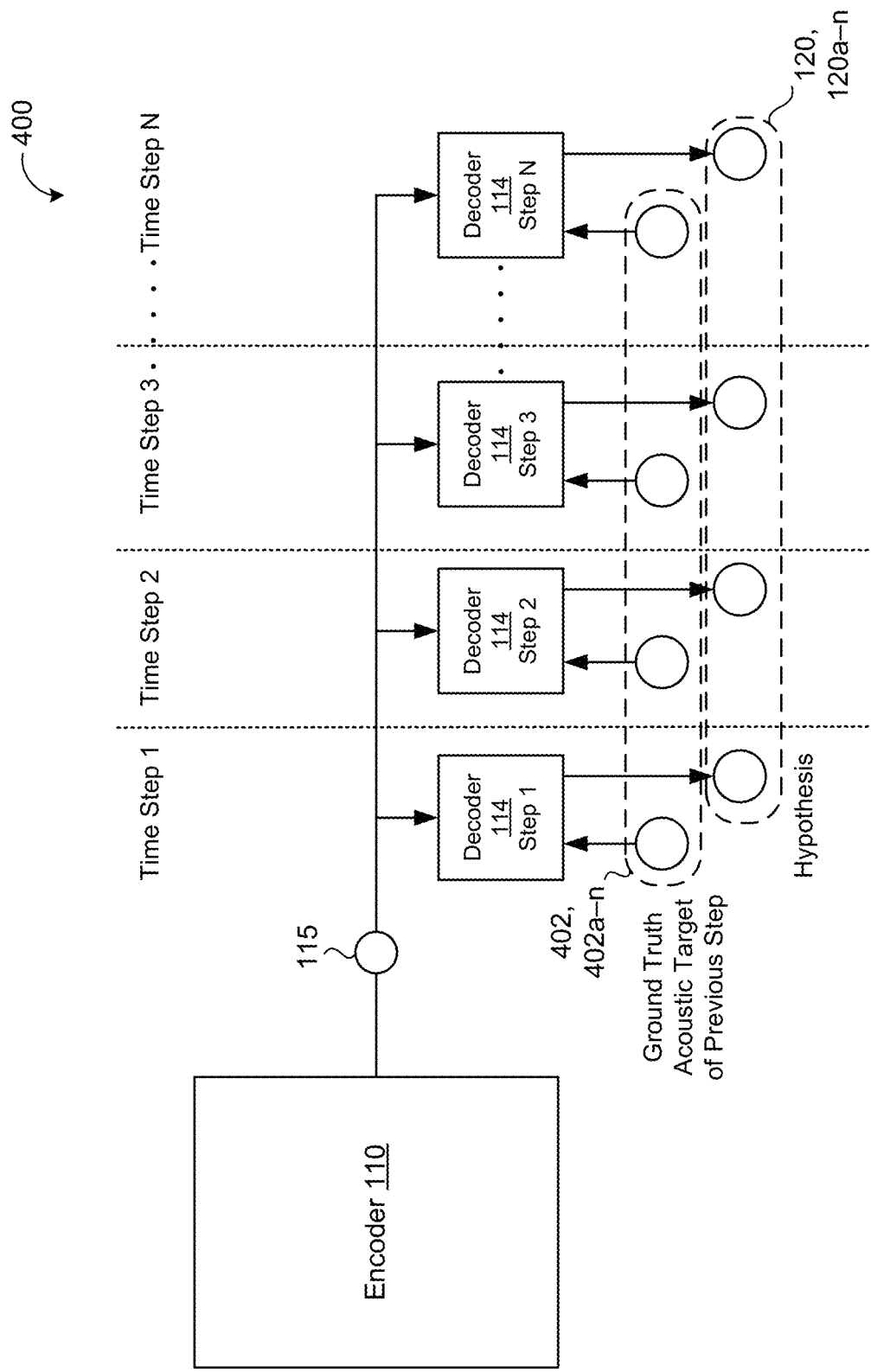
FIG. 4 is a schematic view of training the decoder neural network with multiple time steps.

Referring now to FIG. 4, a schematic view 400 shows an example maximum likelihood training procedure typically used for training decoder neural networks 114. During the maximum likelihood training procedure, the decoder neural network 114 receives as input, at each time step, an output from the encoder 110 (i.e., the fixed-length context vector 115) and a reference audio feature 402, 402a-n (i.e., a "ground truth" acoustic target) from the previous time step and generates a corresponding predicted audio feature 120 (e.g., a hypothesis). This is known as teacher-forcing. For example, at "Time Step 1", the decoder 114 receives the reference audio feature 402 associated with "Time Step 0" (not shown). Similarly, at "Time Step 2", the decoder 114 receives the reference audio feature 402 associated with "Time Step 1", so on and so forth. That is, instead of providing the decoder 114 with the hypothesis/predicted audio feature 120, 120a-n (e.g., output mel-frequency spectrogram118, 118a-n, output time-domain audio waveform 119, output filter coefficients, or vocoder parameters)) from the previous time step as it done during inference, the hypothesis/predicted audio feature 120 is replaced with the reference audio feature 402 during training. The training data 150 (FIG. 1) may include sample input reference texts 104T including a sequence of characters in a particular language and a sequence of reference audio features 402 representative of the sequence of characters. The reference audio features 402 may include reference filter coefficients, reference mel-frequency spectrograms, reference audio samples of a time-domain waveform, or reference vocoder parameters.

The distance between the resulting audio output sequence 106 (FIG. 1) and the sequence of reference audio samples 402 is determined via a loss function (e.g., using mean absolute error). This distance may be small for certain speech sounds (e.g., some fricative consonants) due to small spectral differences, but despite the small differences, these certain speech sounds may be distinct to listeners. Inaccuracy of these speech sounds may significantly increase the unintelligibility of the resulting audio.

Figure 5:
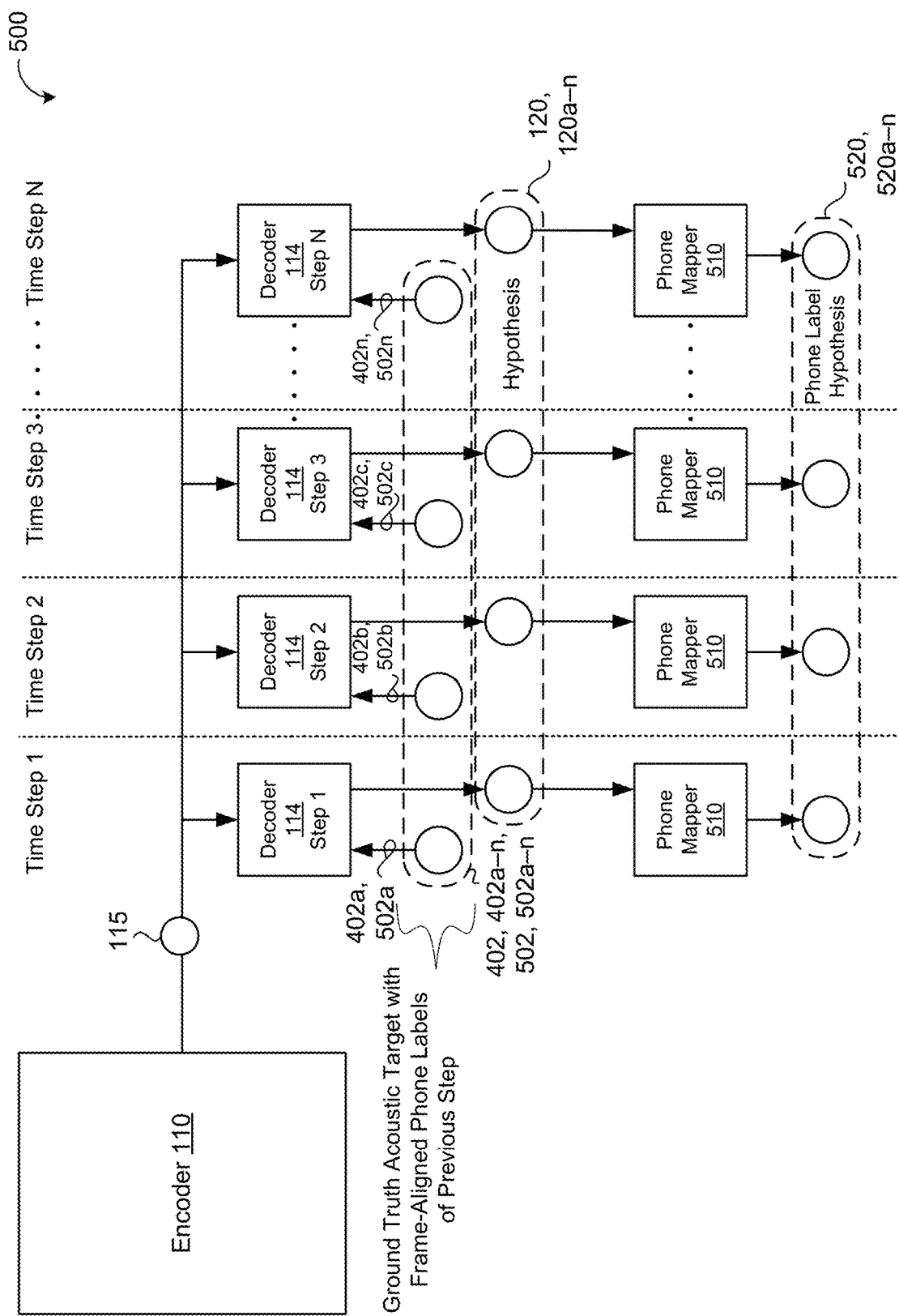
FIG. 5 is a schematic view of training the decoder neural network with a phone label mapping network and multiple time steps.

FIG. 5 shows a schematic view 500 of the TTS model 108 incorporating a phone label mapping network 510 during training to increase the accuracy of the predicted audio features 120 (e.g., mel-frequency spectrograms 118 or predicted audio samples of a time-domain audio waveform) of the decoder 114 for distinct sounds with similar spectral properties. In the example shown, the phone label mapping network 510 receives, for each of a plurality of time steps during training (i.e., each frame), the predicted audio feature 120 for the time step output from the decoder 114 and maps the predicted audio feature 120 to a corresponding phone label 520, 520a-n for the time step representative of a distinct speech sound. That is, the phone label mapping network 510 receives the predicted audio feature 120 generated for the corresponding time step as a feature input, processes the received predicted audio feature 120 to generate the predicted phone label 520 for the corresponding time step, and maps the corresponding predicted phone label 520 generated for the corresponding time step to the predicted audio feature 120 generated for the corresponding time step. As used herein, a phone label 520 refers to any distinct speech sound regardless of whether the exact sound is critical to the meaning of words (as contrasted with phonemes). To put another way, a phone label, or simply phone, is a speech segment that possesses distinct spectral properties to a human listener and serves as a basic unit of phonetic speech analysis. The decoder 114 receives an output from the encoder 110 (i.e., the fixed-length context vector 115) and reference audio features 402, 402a-n with frame aligned phone labels 502, 502a-n of the previous time step. That is, the decoder 114 receives similar inputs as in the maximum likelihood training procedure of FIG. 4, but each reference audio feature 402 of the training data 150 additionally includes a corresponding frame-aligned phone label 502. Here, the frame-aligned phone labels 502 are used during the teacher-forcing training to increase the accuracy of the phone label mapping network 510 and the decoder network 114 such that the predicted audio features (e.g., mel-frequency spectrograms 118) predicted by the decoder 410 learn to match the reference audio feature 402 and the corresponding predicted phone labels 520 learn to match the frame-aligned reference phone labels 502.

Figure 6:
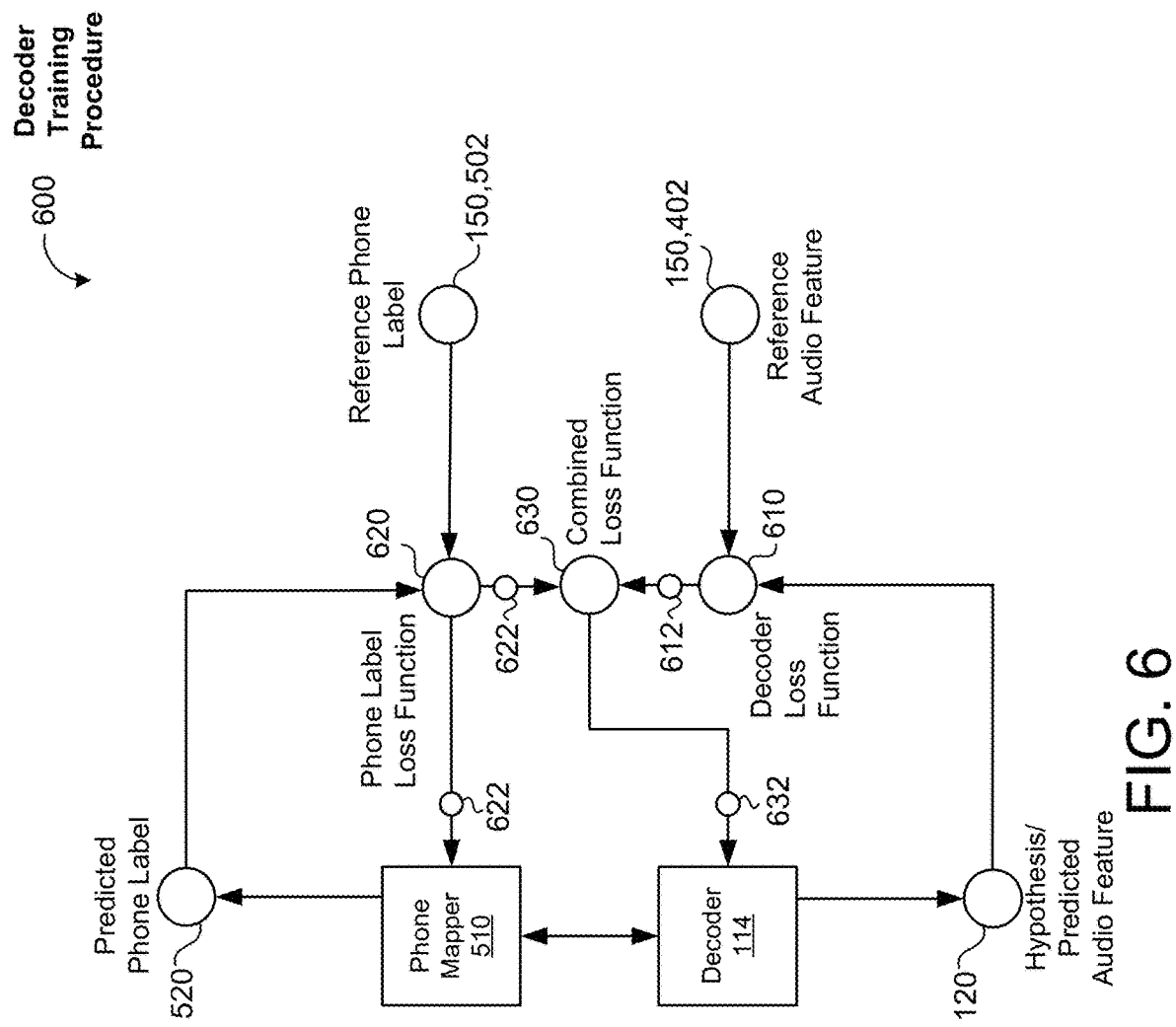
FIG. 6 is a schematic view of loss functions for the decoder neural network.

Referring now to FIG. 6, in some implementations, an example decoder training procedure 600 trains the phone label mapping network 510 and the decoder 114 simultaneously. In this case, the training data 150 includes reference input text 104 including a sequence of characters in a particular language; a sequence of reference audio features 402 representative of the sequence of characters, and a sequence of reference phone labels 502 represented of distinct speech sounds for the sequence of reference audio features 402. In some examples, the training procedure 600 executes, using a speech recognition model, a forced-alignment process to time-align the sequence of reference audio features 402 with the sequence of reference phone labels 502. These reference phone labels 502 correspond to "ground truth" phone label targets 502 for determining the accuracy of the predicted phone label 520 output by the phone label mapping network 510 using a loss function. In some implementations, the predicted phone label 520 for each time step is aligned with the reference phone label to determine a corresponding phone label loss 622. The phone label loss 622 may update the TTS model 108. In some implementations, for each of the plurality of time steps, a decoder loss function 610 determines a corresponding predicted audio feature loss 612 based on the corresponding predicted audio feature 120 for the time step and the reference audio feature 402 of the sequence of reference audio features 402 for the time step. In some examples, the TTS model 108 is updated based on the corresponding predicted audio feature loss 612 determined for each of the plurality of time steps In the example shown, during each time step, a cross-entropy loss function 630 combines a decoder loss 612 (i.e., a predicted audio feature loss) associated with the predicted audio feature 120 output from the decoder 114 and a phone label loss 622 associated with the corresponding predicted phone label 520 output from the phone mapper (e.g., phone label mapping network) 510. Put another way, the cross-entropy loss function 630 adds or otherwise combines the loss (e.g., decoder loss 612) of the time step frame of the spectrogram 118 generated by the decoder network 114 (i.e., a measure of the inaccuracy of the hypothesis output) with the loss (e.g., phone label loss 622) of the corresponding mapped phone label 520 generated by the phone label mapping network 510 (i.e., a measure of the inaccuracy of the phone label mapping network hypothesis). For example, a decoder loss function 610 may be represented by LD(x, x') to produce the decoder loss 612 measuring an accuracy of the predicted audio feature 120 (e.g., mel-frequency spectrogram 118) and a phone label loss function may be represented as $L_{PH}$(ph, ph') to produce the phone label loss 622 measuring an accuracy of the predicted phone label 520. In this example, the cross entropy loss function 630 may combine the loss functions 610, 620 and be represented as follows.

$$L_{CE}(x, ph, x', ph') = L_D(x, x') + c * L_{PH}(ph, ph') \quad (1)$$

Here, $L_{CE}$ represents a cross-entropy loss result 632, x represents the reference audio feature 402, ph represents the frame-aligned reference phone label 502, x' represents the predicted audio feature 120, and ph' represents the predicted phone label 520. In some examples, the TTS model 108 is updated based on the corresponding predicted phone label loss 622 and/or the decoder loss 612 determined for each time step.

The phone label loss function 620, in some examples, is multiplied by a constant (i.e., c) to apply a weight to the mapped predicted phone labels 520. Here, the constant weights the contribution of the predicted phone label 520 in training the decoder 114 to predict speech sounds. For example, increasing a magnitude of the constant increases the magnitude of weight or contribution of the predicted phone label 520 mapping for updating the TTS model, while decreasing the magnitude of the constant decreases the magnitude of the weight or contribution of the predicted phone label 520 mapping for updating the TTS model. The weight may be predetermined or adjusted dynamically based on, for example, the training data 150. Implementing the phone label loss function 620, in some implementations, includes comparing the phone label hypothesis 520 predicted by the phone mapper 510 to the ground truth phone label targets 502 of the training data 150 using a separate forced alignment procedure. Importantly, if the text input 104 is phone based, there is no requirement that the ground truth phone label targets 502 generated from the forced alignment procedure match or be identical to the phones of the input text 104 (though they may be).

The cross-entropy loss result 632 of the combined loss function 630, in some implementations, is returned back to the decoder network 114 (and, in some examples, the encoder 110) to train the decoder network 114. That is, the loss result 632 is used to optimize the parameters (e.g., the weights) of the decoder network 114. In other words, the cross-entropy loss result 632, based on the decoder loss 612 (via the decoder loss function 610) of the decoder network 114 and the phone label loss 622 (via the phone label loss function 620) of the phone label mapping network 510, is used during the decoder training procedure 600 to adjust both the parameters of the decoder network 114 and the phone label mapping network 510. Thus, the decoder 114 will be optimized in a way that directs the decoder 114 to generate predicted audio features 120 (e.g., spectrograms 118) that the phone label mapping network 510 may use to more accurately map predicted phone labels 520. The corresponding predicted audio feature 120 generated for each of the plurality of time steps may include an amplitude value of the predicted waveform 119 at the corresponding time step.

In some implementations, the loss result 632 is fed back to the decoder 114 after every time step or frame to update the TTS model (e.g., change the parameters of the decoder 114 from the loss result 632) by accumulating the loss result 632 over every frame from the sequence of characters 104, and, in some examples, over multiple sequence of characters 104 in a batch. Batch processing allows for training on multiple sequence of characters simultaneously for efficient math processing on advanced computing devices 10 (e.g., graphical processing units (GPU) and tensor processing units (TPU)). Additionally, the updates from the loss result 632 may be averaged over many observations to increase stability of the training. In some examples, the phone label mapping network 510 is trained on just the resulting phone label loss 622 from the phone label loss function 620. That is, parameters of the phone label mapping network 510 are not altered or influenced by the decoder loss 612 from the decoder loss function 610.

Figure 7:
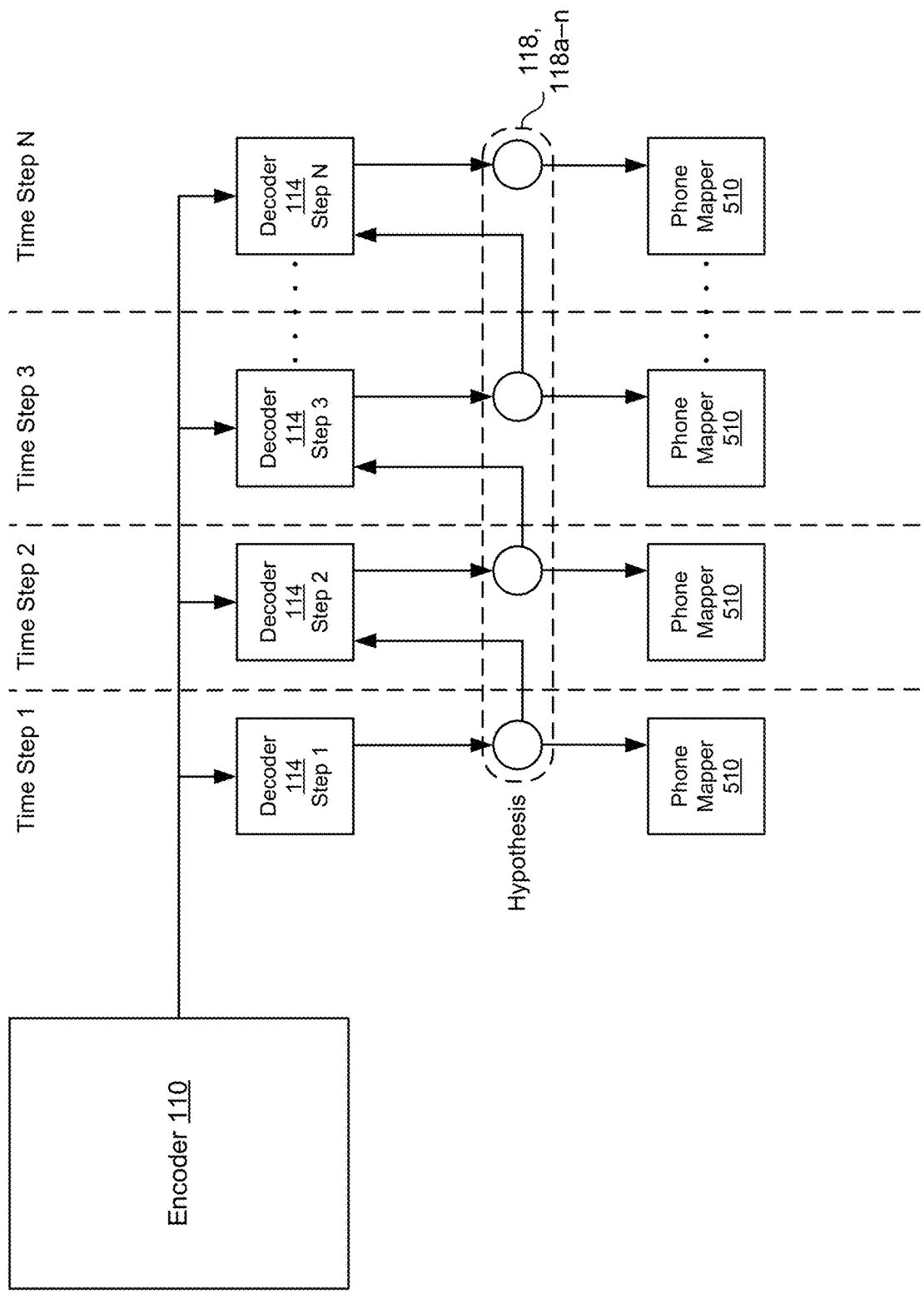
FIG. 7 is a schematic view of the decoder neural network during inference with multiple time steps.

Referring now to FIG. 7, in some examples, a schematic view 700 shows the decoder network 114 of the TTS model 108 discarding the uses of the mapped phone labels 520 during inference. Inference refers to the process of using the trained TTS model 108 to receive input text 104 and predict output audio samples 119 for producing synthesized speech 106 representative of the input text 104. That is, during inference (i.e., after the TTS model 108 is trained and is in use), predicted phone labels 420 output from the phone label mapping network 510 are not applied. During each time step at inference, the decoder 114 receives the predicted audio feature 120 (e.g., mel-frequency spectrogram 118) from decoder 114 during the previous time step as opposed to the reference audio feature 402 and associated frame-aligned reference phone labels 502 for the previous time step used during training.

The phone label mapping network 510 may include many different types of neural networks. For example, the phone label mapping network 510 may include a recurrent neural network (RNN), an LTSM network, or a deep feed forward (DFF) neural network. Training the TTS model 108 and the phone label mapping network 510 together advantageously decreases the word error rate (WER) of the resulting audio data (e.g., mel-frequency spectrograms 118), thus indicating that the synthesized speech 106 produced therefrom is more intelligible to human listeners.

Examples herein illustrate a TTS model 108 that includes the encoder 110 and the decoder 114, however the phone label mapping network 510 is similarly applicable to other types of TTS models or systems to achieve similar improvements in WER. For example, the TTS model 108 may include a parametric synthesizer model that uses the same or similar loss modification, but instead of a decoupled encoder and decoder (e.g., with an attention network), the parametric synthesizer model may include a single frame synchronous neural network. Here, the input textual representation (e.g., sequence of characters of input text 104) may be mapped to the acoustic frames by an external duration model in order for the input and output to be frame synchronous. The phone label mapping network 510 may extend this model in the same manner as the end-to-end speech synthesis model described above.

Figure 8:
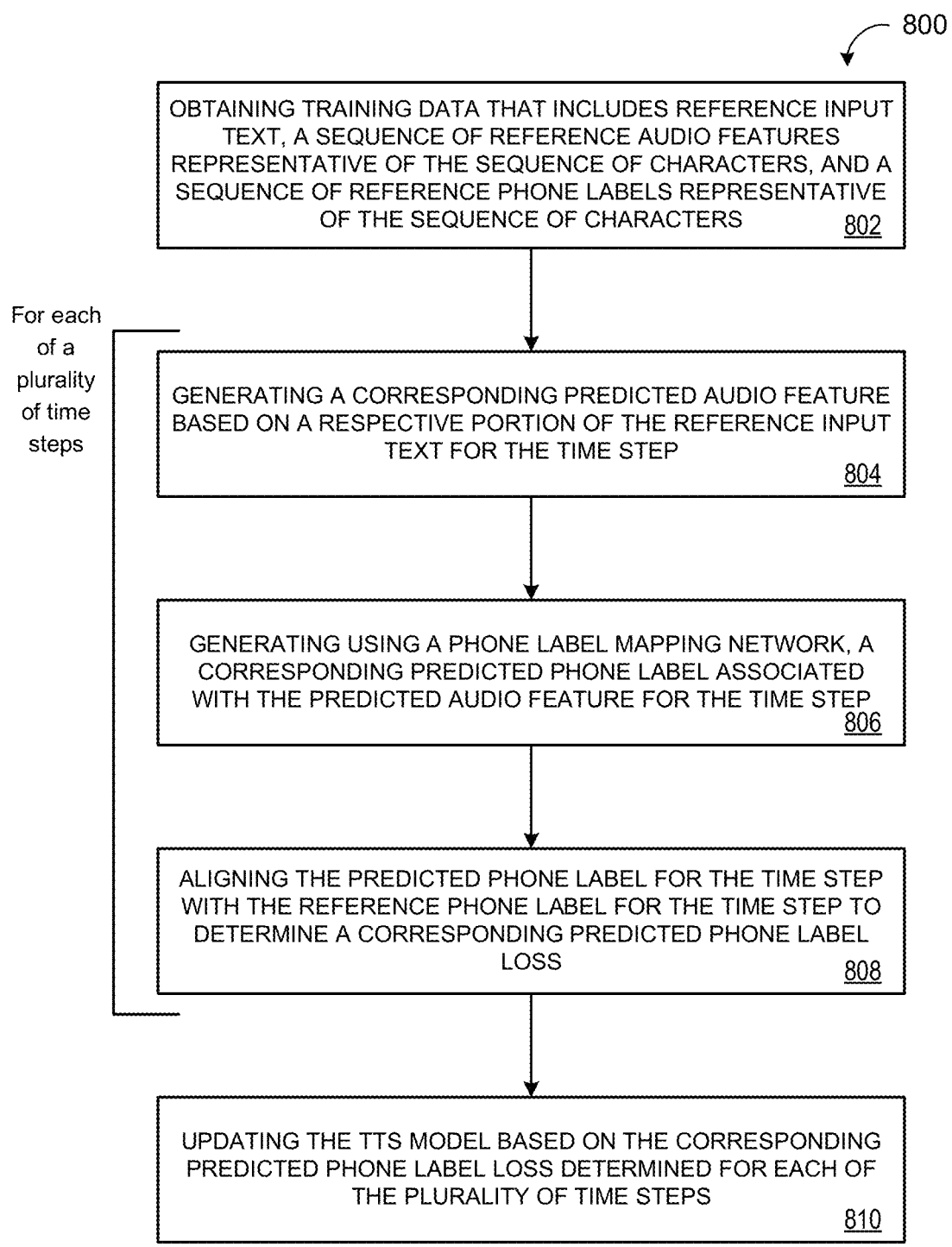
FIG. 8 is a flowchart of an example arrangement of operations for a method of training speech synthesis to generate distinct speech sounds.

FIG. 8 is a flowchart of an exemplary arrangement of operations for a method 800 of training a TTS model. The method 800 starts at operation 802 with obtaining, at data processing hardware 18, training data 150 that includes reference input text 104 that includes a sequence of characters in a particular language, a sequence of reference audio features 402 representative of the sequence of characters, and a sequence of reference phone labels 502 representative of distinct speech sounds for the sequence of reference audio features 402. For each of a plurality of time steps, the method 800 includes, at step 804, generating, by the data processing hardware 18, a corresponding predicted audio feature 120 based on a respective portion of the reference input text 104 for the time step. The method 800, at step 806, includes generating, by the data processing hardware 18, using a phone label mapping network 510, a corresponding predicted phone label 520 associated with the predicted audio feature 120 for the time step. The method 800, at step 808, includes aligning, by the data processing hardware 18, the predicted phone label 520 for the time step with the reference phone label 502 for the time step to determine a corresponding predicted phone label loss 622. The method 800, at step 810, also includes updating, by the data processing hardware 18, the TTS model 108 based on the corresponding predicted phone label loss 622 determined for each of the plurality of time steps.

Figure 9:
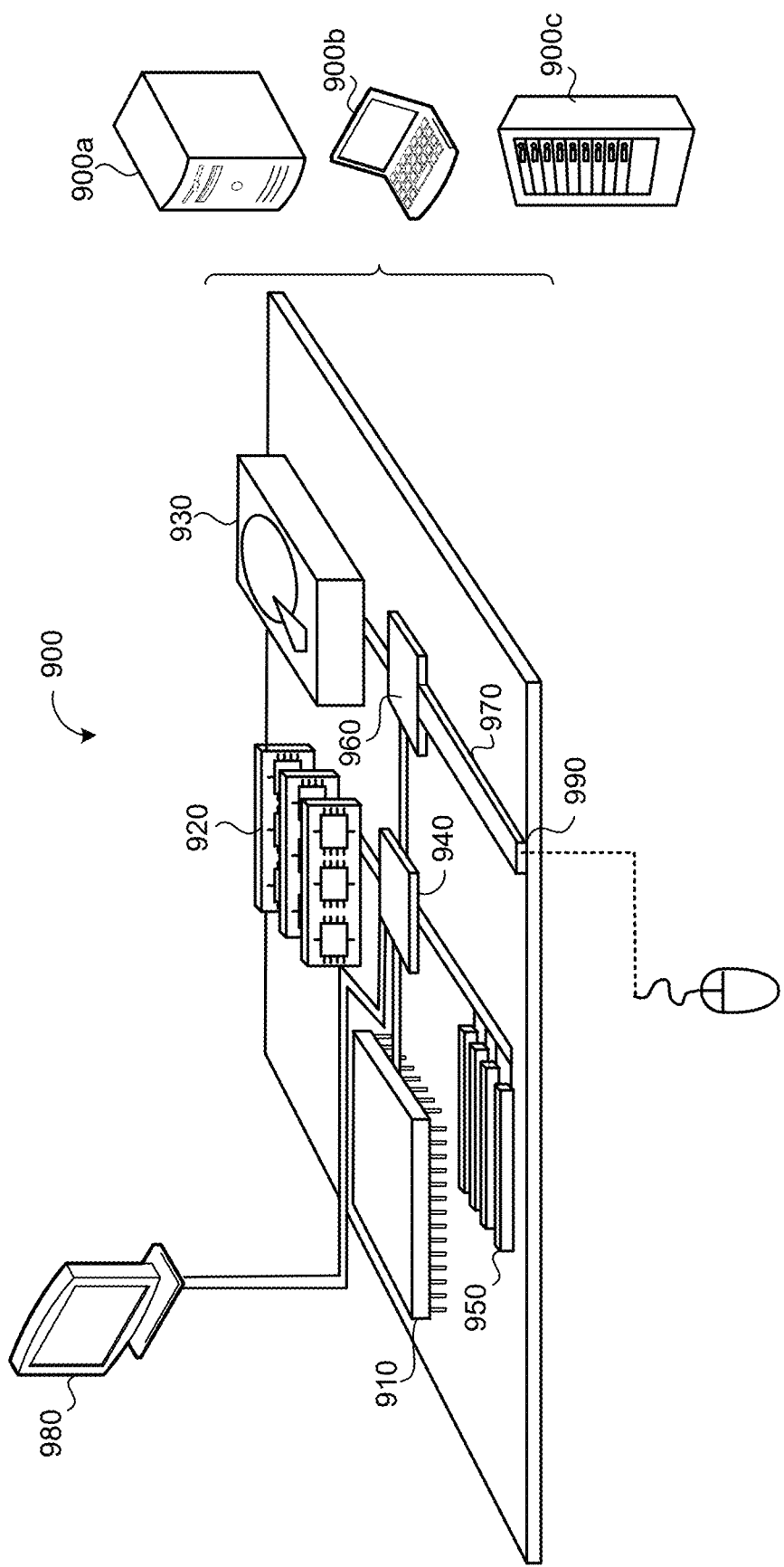
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of training a text-to-speech model, the method comprising:
   obtaining, at data processing hardware, training data comprising:
      reference input text, the reference input text comprising a sequence of characters in a particular language;
      a sequence of reference audio features representative of the sequence of characters; and
      a sequence of reference phone labels representative of distinct speech sounds for the sequence of reference audio features;
   for each of a plurality of time steps:
      generating, by the data processing hardware, corresponding predicted audio feature based on a respective portion of the reference input text for the time step;
      generating, by the data processing hardware, using a phone label mapping network, a corresponding predicted phone label associated with the predicted audio feature for the time step; and
      aligning, by the data processing hardware, the predicted phone label for the time step with the reference phone label for the time step to determine a corresponding predicted phone label loss; and
   updating, by the data processing hardware, the TTS model based on the corresponding predicted phone label loss determined for each of the plurality of time steps.

2. The method of claim 1, further comprising:
   for each of the plurality of time steps, determining, by the data processing hardware, a corresponding predicted audio feature loss based on the corresponding predicted audio feature for the time step and the reference audio feature of the sequence of reference audio features for the time step,
   wherein updating the TTS model is further based on the corresponding predicted audio feature loss determined for each of the plurality of time steps.

3. The method of claim 1, further comprising, executing, by the data processing hardware, using a speech recognition model, a forced-alignment process to time-align the sequence of reference audio features with the sequence of reference phone labels.

4. The method of claim 1, wherein generating, for each of the plurality of time steps, the corresponding predicted audio feature comprises:
- processing, using an encoder neural network, the sequence of characters to generate a feature representation of the sequence of characters;
- processing, using an attention network, the feature representation to generate a fixed-length context vector for the time step; and
- processing, using a decoder neural network, the fixed-length context vector for the time step to generate the corresponding predicted audio feature for the time step.

5. The method of claim 4, wherein:
- the encoder neural network comprises a convolutional layer and a bidirectional long short-term memory layer; and
- the feature representation comprises a sequential feature representation that represents a local structure of the sequence of characters around a particular character in the sequence of characters.

6. The method of claim 4, wherein the decoder neural network comprises an autoregressive neural network comprising a convolutional subnetwork and an output layer.

7. The method claim 1, wherein the corresponding predicted audio feature generated for each of the plurality of time steps is further based on the reference audio feature of the sequence of reference audio features for a previous time step and the reference phone label of the sequence of reference audio features for the previous time step.

8. The method of claim 1, wherein generating, for each of the plurality of time steps, using the phone label mapping network, the corresponding predicted phone label comprises:
- receiving, at the phone label mapping network, the predicted audio feature generated for the corresponding time step as a feature input;
- processing, by the phone label mapping network, the received predicted audio feature generated for the corresponding time step to generate the corresponding predicted phone label for the corresponding time step; and
- mapping, by the phone label mapping network, the corresponding predicted phone label generated for the corresponding time step to the predicted audio feature generated for the corresponding time step.

9. The method of claim 1, wherein the reference audio features comprise reference mel-frequency spectrograms and the predicted audio features comprise predicted mel-frequency spectrograms.

10. The method of claim 1, wherein:
- the sequence of reference audio features corresponds to a reference time-domain audio waveform;
- each of the plurality of time steps corresponds to a respective time in a predicted audio waveform; and
- the corresponding predicted audio feature generated for each of the plurality of time steps comprises an amplitude value of the predicted audio waveform at the corresponding time step.

11. The method of claim 1, wherein the TTS model comprises an encoder neural network, an attention network, and a decoder neural network.

12. The method of claim 1, wherein the TTS model comprises a parametric synthesizer model having a single frame synchronous neural network.

13. A system for training a text-to-speech model, the system comprising:
- data processing hardware; and
- memory hardware in communication with the data processing hardware, the memory hardware storing instructions that when executed on the data processing hardware cause the data processing hardware to perform operations comprising:
- obtaining training data comprising:
  - reference input text, the reference input text comprising a sequence of characters in a particular language;
  - a sequence of reference audio features representative of the sequence of characters; and
  - a sequence of reference phone labels representative of distinct speech sounds for the sequence of reference audio features;
- for each of a plurality of time steps:
  - generating, corresponding predicted audio feature based on a respective portion of the reference input text for the time step;
  - generating, using a phone label mapping network, a corresponding predicted phone label associated with the predicted audio feature for the time step; and
  - aligning the predicted phone label for the time step with the reference phone label for the time step to determine a corresponding predicted phone label loss; and
- updating the TTS model based on the corresponding predicted phone label loss determined for each of the plurality of time steps.

14. The system of claim 13, wherein the operations further comprise:
- for each of the plurality of time steps, determining a corresponding predicted audio feature loss based on the corresponding predicted audio feature for the time step and the reference audio feature of the sequence of reference audio features for the time step, wherein updating the TTS model is further based on the corresponding predicted audio feature loss determined for each of the plurality of time steps.

15. The system of claim 13, wherein the operations further comprise, executing using a speech recognition model, a forced-alignment process to time-align the sequence of reference audio features with the sequence of reference phone labels.

16. The system of claim 13, wherein generating, for each of the plurality of time steps, the corresponding predicted audio feature comprises:
- processing, using an encoder neural network, the sequence of characters to generate a feature representation of the sequence of characters;
- processing, using an attention network, the feature representation to generate a fixed-length context vector for the time step; and
- processing, using a decoder neural network, the fixed-length context vector for the time step to generate the corresponding predicted audio feature for the time step.

17. The system of claim 16, wherein:
- the encoder neural network comprises a convolutional subnetwork and a bidirectional long short-term memory layer; and
- the feature representation comprises a sequential feature representation that represents a local structure of the sequence of characters around a particular character in the sequence of characters.

18. The system of claim 16, wherein the decoder neural network comprises an autoregressive neural network comprising a convolutional subnetwork and an output layer.

19. The system of claim 13, wherein the corresponding predicted audio feature generated for each of the plurality of time steps is further based on the reference audio feature of the sequence of reference audio features for a previous time step and the reference phone label of the sequence of reference audio features for the previous time step.

20. The system of claim 13, wherein generating, for each of the plurality of time steps, using the phone label mapping network, the corresponding predicted phone label comprises:
receiving, at the phone label mapping network, the predicted audio feature generated for the corresponding time step as a feature input;
processing, by the phone label mapping network, the received predicted audio feature generated for the corresponding time step to generate the corresponding predicted phone label for the corresponding time step; and
mapping, by the phone label mapping network, the corresponding predicted phone label generated for the corresponding time step to the predicted audio feature generated for the corresponding time step.

21. The system of claim 13, wherein the reference audio features comprise reference mel-frequency spectrograms and the predicted audio features comprise predicted mel-frequency spectrograms.

22. The system of claim 13, wherein:
the sequence of reference audio features corresponds to a reference time-domain audio waveform;
each of the plurality of time steps corresponds to a respective time in a predicted audio waveform; and
the corresponding predicted audio feature generated for each of the plurality of time steps comprises an amplitude value of the predicted audio waveform at the corresponding time step.

23. The system of claim 13, wherein the TTS model comprises an encoder neural network, an attention network, and a decoder neural network.

24. The system of claim 13, wherein the TTS model comprises a parametric synthesizer model having a single frame synchronous neural network.

* * * * *